United States Patent [19]
Blaydon, deceased et al.

[11] 3,951,482
[45] Apr. 20, 1976

[54] UNITIZED THRUST BEARING AND SEAL ASSEMBLY

[75] Inventors: Thomas J. Blaydon, deceased, late of Lincolnton, N.C., by Bonnie J. Blaydon, administratrix; Edward W. Linser, Gastonia, N.C.

[73] Assignee: Garlock Inc., Palmyra, N.Y.

[22] Filed: Feb. 3, 1975

[21] Appl. No.: 546,715

[52] U.S. Cl. .............................................. 308/187.1
[51] Int. Cl.² .......................................... F16C 33/72
[58] Field of Search ................ 308/187.1, 230, 231, 308/227, 232, 233, 234

[56] References Cited
UNITED STATES PATENTS
3,844,631  10/1974  Otto et al. ......................... 308/187.1

Primary Examiner—M. H. Wood, Jr.
Assistant Examiner—Gene A. Church
Attorney, Agent, or Firm—Schovee & Boston

[57] ABSTRACT

A unitized thrust bearing is held within an interlocking seal assembly including outer and inner seal elements each having a radial portion and a cylindrical portion at the outer end of the radial portion, with the cylindrical portions extending toward each other. The outer cylindrical portion is metal and includes a radially inwardly extending locking member at the distal end thereof and the inner cylindrical portion has a radially outwardly extending O.D. sealing lip. The locking member and sealing lip provide an interference fit therebetween and must snap past one another to lock the seal elements together and unitize the thrust bearing. The radial portions of each of the seal elements includes an I.D. shaft sealing lip molded thereto.

20 Claims, 1 Drawing Figure

U.S. Patent April 20, 1976 3,951,482
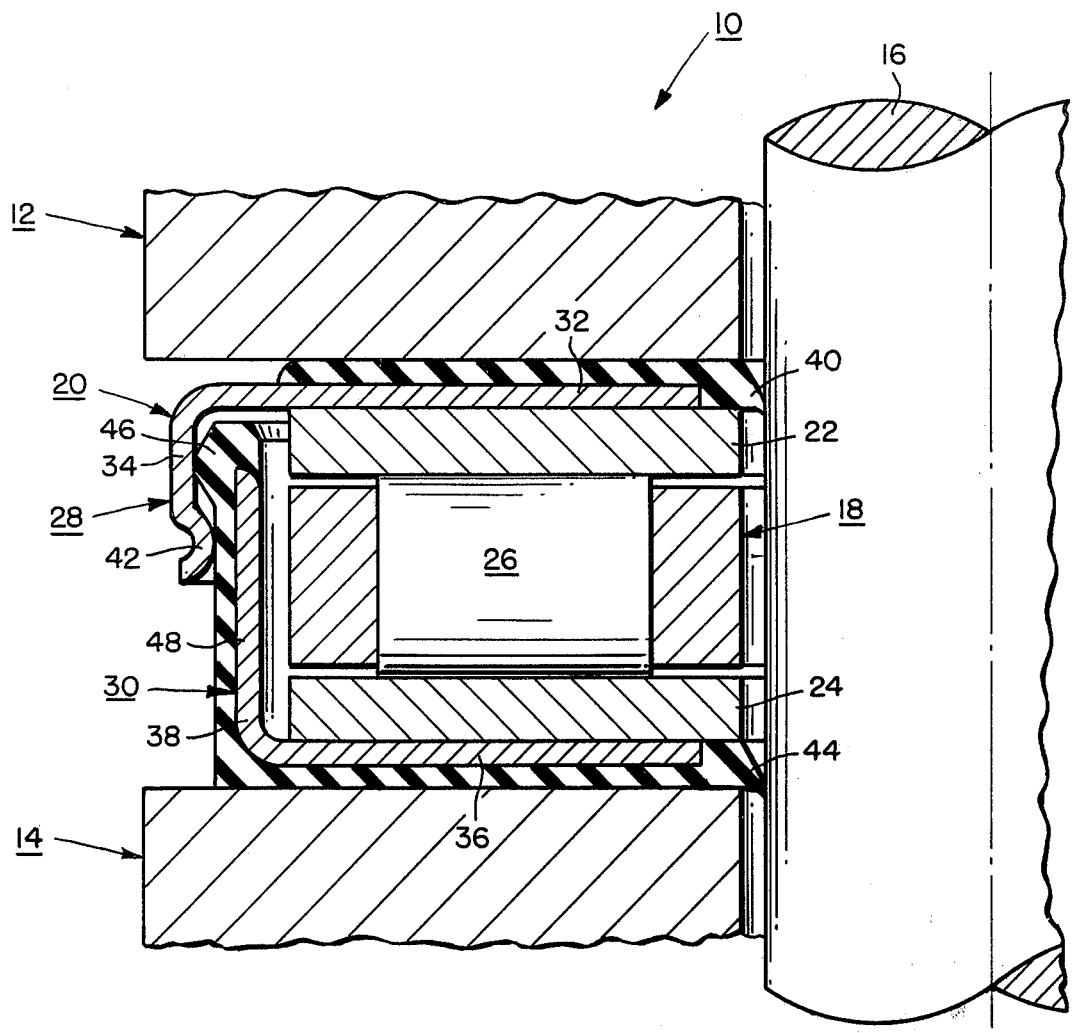

UNITIZED THRUST BEARING AND SEAL ASSEMBLY

BACKGROUND OF THE INVENTION

1. Field of the Invention

This invention relates to seal assemblies and in particular to an interlocking seal assembly for utilizing a thrust bearing.

2. Description of the Prior Art

Typical thrust bearings, when installed in certain applications can be exposed to atmospheric contaminants such as dust, dirt, water, etc. which can cause reduced life of the thrust bearing. Also, the three components of the thrust bearing have to be installed in the application separately, which can be very time consuming and costly when it has to be done on a final assembly line. While it is known to provide a unitized thrust bearing and interlocking seal assembly as described in U.S. Pat. No. 3,844,631, such assembly is subject to various disadvantages in that, for example, when the O.D. sealing lip is exposed to abrasion it is found to abrade rapidly and once gone, the assembly will have no O.D. seal whereby contaminants can freely enter into the thrust bearing and reduce its lifetime. Further, any water, for example, that gets past the O.D. sealing lip simply passes directly into the thrust bearing. This prior art bearing also requires a separate shoulder to form a locking mechanism to unitize the seal assembly.

It is an object of the present invention to provide an improved unitized thrust bearing and interlocking seal assembly that overcomes the problems and disadvantages of the prior art.

It is a further object of the present invention to provide a unitized thrust bearing and interlocking seal assembly which has an outer metal case or seal element to protect the O.D. sealing lip on the inner metal case or seal element, which includes an O.D. seal, and a labyrinth seal which does not require a separate shoulder to form a locking mechanism, and which includes an I.D. seal bonded to each seal element.

SUMMARY OF THE INVENTION

A unitized thrust bearing and interlocking seal assembly including a thrust bearing enclosed within the seal assembly which includes outer and inner seal elements, each seal element including a radial portion and a cylindrical portion with the cylindrical portions extending toward each other and with the radial portions being spaced-apart to define a thrust bearing chamber. The outer cylindrical portion has a radially inwardly extending locking member at the distal and thereof extending toward the outer surface of the inner cylindrical portion and the inner cylindrical portion has a radially outwardly extending O.D. sealing lip at the distal end thereof extending into contact with the inner surface of the outer cylindrical portion, whereby the O.D. sealing lip and locking member snap past one another when the seal elements are connected in interlocking relationship unitizing the thrust bearing in the thrust bearing chamber. The O.D. sealing lip prevents contaminates from entering the bearing from the O.D. of the assembly and the seal elements each include an I.D. sealing lip for preventing any contaminates from entering the bearing from the shaft side of the assembly.

BRIEF DESCRIPTION OF THE DRAWINGS

The present invention will be more fully understood by reference to the following detailed description thereof, when read in conjunction with the attached drawing, wherein like reference numerals refer to like elements and wherein;

The FIGURE is a partial cross-sectional view through the unitized thrust bearing and seal assembly of the present invention.

DETAILED DESCRIPTION OF THE PREFERRED EMBODIMENTS

Referring now to the drawing, the FIGURE shows a unitized thrust bearing and seal assembly 10 installed in an application between a pair of relatively arcuately movable members 12 and 14 and about a shaft 16. The assembly 10 includes a thrust bearing 18 and a seal assembly 20. The thrust bearing 18 includes a first and a second bearing race 22 and 24, respectively, provided with opposed raceways, and with roller bearings 26 interposed between and engageable with the raceways to enable the bearing races to rotate freely with respect to each other. The seal assembly 20 includes an outer seal element 28 and an inner seal element 30.

The outer seal element 28 includes a radial portion 32 and an outer cylindrical portion 34 and the inner seal element 30 includes a radial portion 36 and an inner cylindrical portion 38. These various portions are preferably made of metal with synthetic rubber molded thereto as described below.

The radial portion 32 has an I.D. sealing lip 40 preferably of synthetic rubber molded thereto and preferably with a layer of the synthetic rubber also covering the outer surface of the radial portion 32. The cylindrical portion 34 has a radially inwardly extending locking member 42 formed as shown in the FIGURE and extending toward the outer surface of the inner cylindrical portion 38.

The radial portion 36 has an I.D. sealing lip 44 preferably of synthetic rubber molded thereto and preferably with a layer of the synthetic rubber also covering the outer surface of the radial portion 36 and extending to the distal end of the cylindrical portion 38 and forming there a radially outwardly extending O.D. sealing lip 46. The cylindrical portion 38 of the inner seal element 30 thus includes a metal part 48 and a synthetic rubber part molded thereto. The metal part 48 extends nearly to the distal end of the cylindrical portion 38 to provide support for the O.D. sealing lip 46. The O.D. sealing lip 46 extends radially outwardly into contact with the inner surface of the cylindrical portion 34 of the outer seal element 28 to provide, with the locking member 42, the interlocking mechanism for the seal assembly 20.

To assemble the unitized thrust bearing and interlocking seal assembly 10, the thrust bearing 18 is placed as shown into the inside face of the inner seal element 30 and then the outer seal element 28 is installed so that the locking member 42 comes into contact with the O.D. sealing lip 46. With a small amount of force, the locking member 42 will snap over the O.D. sealing lip 46 to securely lock the two seal elements together and unitize the thrust bearing 18.

The unitized thrust bearing can be greased after it has been assembled in the seal assembly 20, and the O.D. sealing lip 46 will purge grease.

The fact that the outer cylindrical portion 34 is metal protects the O.D. sealing lip 46 from being subject to abrasion. Further, even if the O.D. sealing lip 46 does abrade and lose sealing effect, the locking member 42 provides a labyrinth seal between itself and the outside surface of the inner cylindrical portion 38. The O.D. sealing lip 46 prevents any water that gets past the locking member 42 from getting into the thrust bearing 18; the water would simply drain back out past the locking member 42. This structure also eliminates the need for a separate shoulder to form the locking mechanism because the metal part 48 of the inner cylindrical portion 38 extends almost to the distal end thereof providing the O.D. sealing lip 46 with extra rigidity so that the O.D. sealing lip 46 itself forms one-half of the locking mechanism without the need for a separate shoulder.

This invention has been described in detail with particular reference to the preferred embodiment thereof, but it will be understood that variations and modifications can be effected within the spirit and scope of the invention as described hereinabove and as defined in the appended claims.

We claim:
1. A seal assembly for a thrust bearing comprising:
   a. an annular outer seal element including a radial portion and an outer cylindrical portion connected to the radial portion at the radially outer end thereof;
   b. an annular inner seal element including a radial portion and an inner cylindrical portion connected to the radial portion at the radially outer end thereof;
   c. said cylindrical portions extending toward each other with the inner cylindrical portion being located radially inside of the outer cylindrical portion and with said radial portions being spaced apart to provide a thrust bearing chamber therebetween;
   d. said outer cylindrical portion being metal and having a radially inwardly extending locking member at the distal end thereof, extending toward said inner cylindrical portion, and
   e. said inner cylindrical portion including a metal part and having a radially outwardly extending O.D. sealing lip at the distal end thereof bonded to said metal part and extending into contact with said outer cylindrical portion, said O.D. sealing lip and said locking member having an interference fit therebetween, whereby they have to snap past one another when said elements are connected in interlocking relationship.

2. The apparatus according to claim 1 wherein at least one of said radial portions includes an I.D. shaft sealing lip on its radially inner edge.

3. The apparatus according to claim 2 wherein each of said radial portions includes an I.D. shaft sealing lip.

4. The apparatus according to claim 3 wherein said radial portions are metal and wherein said I.D. sealing lips are synthetic rubber bonded to said radial portions.

5. The apparatus according to claim 4 wherein said molded rubber bonded to said inner element includes a layer extending continuously from said I.D. sealing lip to said O.D. sealing lip on the axially and radially outer surface thereof.

6. The apparatus according to claim 4 wherein said molded rubber bonded to said radial portion of said outer seal element includes a layer covering the outer surface of said radial portion.

7. The apparatus according to claim 1 wherein said O.D. sealing lip is formed of synthetic rubber bonded to a metal part of said inner cylindrical portion.

8. The apparatus according to claim 7 including a layer of molded rubber covering the outer cylindrical surface of said inner cylindrical portion.

9. The apparatus according to claim 8 wherein said metal part extends to and underlies at least a portion of said O.D. sealing lip.

10. The apparatus according to claim 9 wherein said metal part terminates short of the distal end of said inner cylindrical portion.

11. A unitized thrust bearing and interlocking seal assembly comprising:
   a. a thrust bearing having spaced-apart first and second races provided with opposed raceways and bearing elements interposed between and engagable with the raceways to enable the bearing races to rotate freely with respect to each other;
   b. an annular outer seal element including a radial portion and an outer cylindrical portion connected to the radial portion at the radially outer end thereof;
   c. an annular inner seal element including a radial portion and an inner cylindrical portion connected to the radial portion at the radially outer end thereof;
   d. said cylindrical portions extending toward each other with the inner cylindrical portion being located radially inside of the outer cylindrical portion and with said radial portions being spaced-apart to provide a thrust bearing chamber therebetween, with said thrust bearing being located therein.
   e. said outer cylindrical portion being metal and having a radially inwardly extending locking member at the distal end thereof, extending toward said inner cylindrical portion, and
   f. said inner cylindrical portion including a metal part and having a radially outwardly extending O.D. sealing lip at the distal end thereof bonded to said metal part and extending into contact with said outer cylindrical portion, sad O.D. sealing lip and said locking member having an interference fit therebetween, whereby they have to snap past one another when said elements are connected in interlocking relationship.

12. The apparatus according to claim 11 wherein at least one of said radial portions includes an I.D. shaft sealing lip on its radially inner edge.

13. The apparatus according to claim 12 wherein each of said radial portions includes an I.D. shaft sealing lip.

14. The apparatus according to claim 13 wherein said radial portions are metal and wherein said I.D. sealing lips are synthetic rubber bonded to said radial portions.

15. The apparatus according to claim 14 wherein said molded rubber bonded to said inner element includes a layer extending continuously from said I.D. sealing lip to said O.D. sealing lip on the axially and radially outer surface thereof.

16. The apparatus according to claim 14 wherein said molded rubber bonded to said radial portion of said outer seal element includes a layer covering the outer surface of said radial portion.

17. The apparatus according to claim 11 wherein said O.D. sealing lip is formed of synthetic rubber bonded to a metal part of said inner cylindrical portion.

18. The apparatus according to claim 17 including a layer of molded rubber covering the outer cylindrical surface of said inner cylindrical portion.

19. The apparatus according to claim 18 wherein said metal part extends to and underlies at least a portion of said O.D. sealing lip.

20. The apparatus according to claim 19 wherein said metal part terminates short of the distal end of said inner cylindrical portion.

* * * * *